(12) United States Patent
Mölne

(10) Patent No.: US 8,269,731 B2
(45) Date of Patent: Sep. 18, 2012

(54) INTEGRATED PRESSURE SENSITIVE LENS ASSEMBLY

(75) Inventor: Anders Mölne, Cary, NC (US)

(73) Assignee: F-Origin, Inc., Morrisville, NC (US)

( * ) Notice: Subject to any disclaimer, the term of this patent is extended or adjusted under 35 U.S.C. 154(b) by 522 days.

(21) Appl. No.: 12/310,837

(22) PCT Filed: Sep. 7, 2007

(86) PCT No.: PCT/US2007/019606
§ 371 (c)(1),
(2), (4) Date: Mar. 9, 2009

(87) PCT Pub. No.: WO2008/030594
PCT Pub. Date: Mar. 13, 2008

(65) Prior Publication Data
US 2010/0045612 A1 Feb. 25, 2010

(51) Int. Cl.
*G06F 3/041* (2006.01)
(52) U.S. Cl. .................................................. 345/173
(58) Field of Classification Search ................ None
See application file for complete search history.

(56) References Cited

U.S. PATENT DOCUMENTS

| | | | | |
|---|---|---|---|---|
| 5,008,497 A * | 4/1991 | Asher | | 178/18.05 |
| 5,241,308 A * | 8/1993 | Young | | 341/34 |
| 5,515,738 A * | 5/1996 | Tamori | | 73/862.46 |
| 5,543,588 A * | 8/1996 | Bisset et al. | | 178/18.06 |
| 6,995,752 B2 * | 2/2006 | Lu | | 345/174 |
| 7,176,897 B2 * | 2/2007 | Roberts | | 345/173 |
| 7,406,881 B2 * | 8/2008 | Tanabe | | 73/862.041 |
| 7,499,039 B2 * | 3/2009 | Roberts | | 345/177 |
| 2009/0066673 A1 * | 3/2009 | Molne et al. | | 345/178 |

* cited by examiner

*Primary Examiner* — K. Wong
(74) *Attorney, Agent, or Firm* — Ober, Kaler, Grimes & Shriver; Royal W. Craig

(57) ABSTRACT

A touch screen assembly for an electronic device such as a cell phone or PDA. The touch screen assembly generally comprises a floating lens suspended over the display and, optionally, the keypad to allow a degree of freedom. An underlying thin connecting layer such as a flex film is attached beneath the floating lens, and a plurality (for example, four) differentially-mounted pressure sensors are mounted beneath the floating lens and are electrically connected to the electronic device via the flex film. The pressure sensors are differentially positioned along an x- and y-axis for registering a pressure z from a touch to the lens at each of the four positions, to provide four data sets ($x_{1-4}$, $y_{1-4}$, $z_{1-4}$). Control software then interprets the exact touch-coordinate from the four data sets and generates a control signal. An optional haptic response generator and/or motion sensor are also contemplated. When used in a smaller electronics device such as a cell phone or PDA the touch screen sensor technology of the present invention is exceedingly thin and is capable of modular assembly for more-or-less "snap-in" construction.

22 Claims, 7 Drawing Sheets

INTEGRATED PRESSURE SENSITIVE LENS ASSEMBLY

BACKGROUND OF THE INVENTION

1. Field of the Invention

The present invention relates to input devices for electronics and, more particularly, to a touch sensitive input panel or display with small form factor especially suited for use in cellular phones and personal digital assistants (PDAs), PC Tablets, as well as laptops, PCs, office equipment, medical equipment, or any other device that uses touch sensitive displays or panels.

2. Description of the Background

Touch screens have been deployed in many products in recent years.

There are several types of technology used in implementing touch sensitive screens that can detect the application of fingers and other passive objects.

For example, resistive pads comprise two conductive plates pressed together. The disadvantage of a resistive pad is that it requires a fixed amount of pressure by a finger in order to make the contact between the two conductive plates. This leads to user fatigue due to non-user optimized touch screen sensitivity. The resistive membrane will also wear out, initially resulting in further reduced clarity followed by dead spots.

Capacitive touchpads operate by measuring the capacitance of the passive object to ground, or by measuring the alteration of the transcapacitance between different sensors. An example of a capacitive touchpad is described in U.S. Pat. No. 5,495,077 to Miller. Capacitive pads are relatively expensive to manufacture, and can only detect objects with sufficient capacitance. Small objects, such as the end of a regular stylus or pen, do not have enough capacitance to ground or transcapacitance to be detected by a capacitive touchpad.

Surface acoustic wave devices operate by emitting sound along the surface of the pad and measuring the interaction of the passive object with the sound. These devices work well, but are generally much too expensive for general applications.

Finally, there are devices that use force sensors to measure the location and magnitude of the force exerted by the passive object on the touchpad. A force sensitive touchpad will sense force applied by any sort of passive object, regardless of the electrical conductivity or composition of the object. Such devices were originally described in U.S. Pat. No. 3,657,475 to Peronneau et al. and U.S. Pat. No. 4,121,049 to Roeber. These devices measure the forces transmitted by the touchpad to a fixed frame at multiple points e.g., at the corners of the pad. Roeber discloses a mathematical formula for deriving the position and magnitude of the force applied by a passive object from the forces measured at the multiple points.

For example, U.S. Pat. No. 4,511,760 to Garwin et al. issued Apr. 16, 1985 shows a force sensing data input device responding to the release of pressure force. The input surface is provided with a transparent faceplate mounted on force-sensing piezoelectric transducers. Preferably, four piezoelectric transducers are provided, one at each corner of a rectangular opening formed in the frame. To determine the point of application of force on the input surface, the outputs of the four transducers are first summed. To constitute a valid data entry attempt, the sum must exceed a first threshold while the user is pushing on the input surface. When the user releases his finger, a peak of the sum is detected, which is of opposite polarity from the polarity of the sum for the pushing direction. The individual outputs of the four sensors at the time that the peak of the sum occurs are used to calculate the point of application of the force.

United States Patent Application 20030085882 by Lu published May 8, 2003 shows a touch pad device having a support layer with a plurality of strain gauges in a matrix configuration. A touch layer is disposed on top of the strain gauge matrix, the touch layer being joined to the top of the strain gauge matrix. Sensor wires connect the strain gauges to a processor which is programmed with an algorithm to measure the location and pressure of simultaneous, multiple touches.

United States Patent Applications 20040108995 and 20040021643 both by Hoshino et al. show a display unit with touch panel mounted above a display via four differentially-mounted sensors. The pressure sensors detect force with which a pointing device such as a finger pushes the panel surface, in real time. The force P with which the pointing device such as a finger pushes the panel surface is found from the following equation irrespective of the pointing position: $P=a+b+c+d-a0+b0+c0+d0$, which equation detects dragging of a cursor.

United States Patent Application 20050156901 by Ma et al. issued Jul. 21, 2005 shows a touch screen display system with a display screen and overlying touch surface. An imaging system determines an angular position on the touch surface of the object coming in contact with the touch surface.

United States Patent Application 20060119589 by Rosenberg shows a haptic feedback feature for touchpads and other touch controls in which at least one actuator is coupled to the touch input device and outputs a force to provide a haptic sensation to the user contacting the touch surface. Output haptic sensations on the touch input device can include pulses, vibrations, and spatial textures. The claims require touch panel mounted on a suspension, and an actuator configured to output haptic feedback to the compliant suspension which amplifies the haptic feedback.

United States Patent Application 20060016272 by Chang published Jan. 26, 2006 shows a thin film touch pad with opposed sensor elements that generate an electrical signal that is proportional to both the applied pressure and the surface area at the location of the applied pressure. As a result of the complementary orientation and overlapping for these sensor elements, the first and second sensor elements generate an asymmetric pair of signals that uniquely define the applied pressure by position and magnitude.

U.S. Pat. No. 6,879,318 by Chan et al. issued Apr. 12, 2005 shows a touch screen mounting assembly for a liquid crystal display panel LCD including a bottom frame, a backlight panel seated in the frame and that has a plurality of pressure-sensitive transducers mounted thereon, a liquid crystal display panel, and a top frame for exerting pressure when mounted to the bottom frame such that a plurality of compressible springs biases the LCD panel towards the bottom frame when touched or contacted by a user. The claims require the bottom and top frame assembly with backlight panel mounted therein on springs, and an overlying LCD panel.

Despite the foregoing, a commercially viable force-based touch sensor for use with consumer equipment, such as computers, must be both inexpensive and precise. The precision required of such a device is the capability to sense both fingers and pens over a pressure range from about 1 gram to 300 grams or more, with a positional precision of 9 bits over this range. This precision level requires a sensor that can measure typical displacements of up to about 0.01-0.1 mm (mils) with a noise floor of 14 bits. When used in a smaller electronics device the sensor must also be thin, typically less than about 2 mm, although for some products it may be up to 20 mils maximum thickness, and should also be capable of modular assembly for more-or-less "snap-in" construction. In today's electronic industry the manufacturer of an electronic device utilizing a pressure sensitive touch sensitive display solution will look to their display supplier for a complete solution that is ready to be integrated into the overall product design. Despite the availability of the existing sensing technologies mentioned herein, the prior art has been unable to provide a low-cost sensor assembly having sufficient accuracy and form factor.

It would, therefore, be greatly advantageous to provide a force sensing technology which overcomes some of the deficiencies of the prior art.

SUMMARY OF THE INVENTION

Accordingly, it is an object of the present invention to provide a low-cost pressure sensitive touch sensitive display solution suitable for manufacturers of portable electronic devices such as cell phones and PDAs.

It is another object to provide a pressure sensitive touch sensitive display as above that is a turnkey solution for manufacturers, ready to be integrated into an overall product design without disrupting the existing cost or form factor of the electronic device.

These and other objects are accomplished herein by a touch screen assembly for an electronic device having a display and/or keypad. The touch screen assembly generally comprises a floating lens suspended over the display, or as an alternative a floating display module, and, optionally, the keypad to allow a degree of freedom. An underlying thin flex film is attached beneath the floating lens, and a plurality (n=1 ... m) differentially-mounted pressure sensors are mounted beneath the floating lens and are electrically connected to the electronic device via the flex film. The pressure sensors are differentially positioned along an x- and y-axis for registering a pressure z from a touch to the lens at each of the positions, to provide a corresponding plurality of data sets (x1-m, y1-m, z1-m). Control software then interprets the exact touch-coordinate from the plurality data sets and generates a control signal in accordance with the touch coordinate. An optional haptic response generator may be coupled to the lens for generating a vibration burst when pressure is registered against the lens. In addition, a motion sensor may be connected through the flex film for responding to position, orientation and movement. When used in a smaller electronics device such as a cell phone or PDA the touch screen sensor technology of the present invention is exceedingly thin, typically adding 0 mm to 3 mm (mils) maximum thickness. For a larger device, such as a copy machine, the maximum thickness may be us much as 20 mm, but will usually be less then 10 mm. Moreover, the device is capable of modular assembly for more-or-less "snap-in" construction. Other variations and advantages are described in the detailed description below.

BRIEF DESCRIPTION OF THE DRAWINGS

Other objects, features, and advantages of the present invention will become more apparent from the following detailed description of the preferred embodiments and certain modifications thereof when taken together with the accompanying drawings in which.

DETAILED DESCRIPTION OF THE PREFERRED EMBODIMENTS

The present invention is a touch sensitive display for an electronics device such as cell phones, PDAs, desktop phones, tablets, copy machines, or any other device that uses touch sensitive displays or panels including LCD or Organic Light-Emitting Diode (OLED) display screens.

Generally, the invention comprises a plurality (such as, for example, four) differentially-mounted pressure sensors to detect the force imparted to a primary touch surface. Two basic mechanical embodiments are disclosed. In one embodiment the sensors are mounted beneath the display module itself. Most conventional display screens (LCD or otherwise) are reinforced with a bonded protective lens. This lens is typically a 0.70 mm to 1.2 mm treated glass, protecting the LCD against cracks, scratching and also providing anti-glare coating. The existing glass lens serves as the primary touch surface, and the force imparted to the primary touch surface is transmitted through the display module and is detected by the differentially-mounted pressure sensors beneath the display module.

Alternately, as explained below, a separate free-floating lens may be used overtop the display module (independently suspended there over). The free floating lens straddles the display module and bears directly against the differentially-mounted pressure sensors.

In all embodiments an optional haptic feedback element may be mounted beneath the LCD module for providing tactile feedback. All necessary electrical components are connected with a thin flex film (or alternatively wires, printed circuit board, or combination thereof) underlying the lens, and all peripheral components such as resistors and amplifiers may be likewise mounted on this flex film. The flex film is terminated by a flex film connector that connects directly to the printed circuit board of the electronics device. The structure is modular and can be easily integrated in existing electronics devices. If desired, the flex film wiring may be extended to the display module itself so that the entire assembly can be connected through one flex film connection (for control and power to the device PCB, display signals to the screen, and touch/tactile feedback).

A software component is also provided, the software including a driver and positioning algorithms for interpreting the force sensor data. While the software can be resident in the electronics device main processor, it may alternatively reside on a small controller unit mounted to the flex film as a part of the touch sensitive display assembly. A more detailed breakdown of the touch sensitive display assembly and its variations follows.

Figure 1:
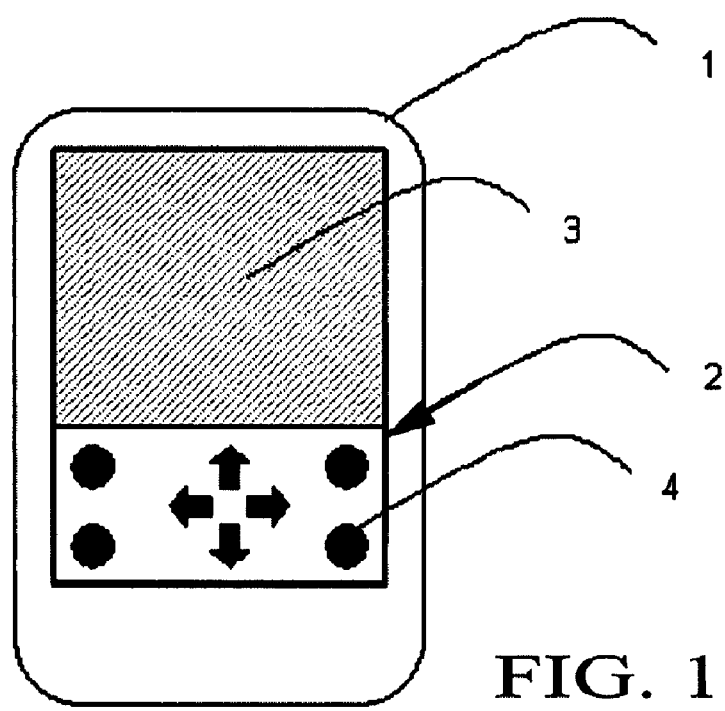
FIG. 1 is a high level representation an electronic device 1, such as a PDA or a cellular phone, having a touch screen assembly 2 according to one embodiment of the present invention.
Figure 2:
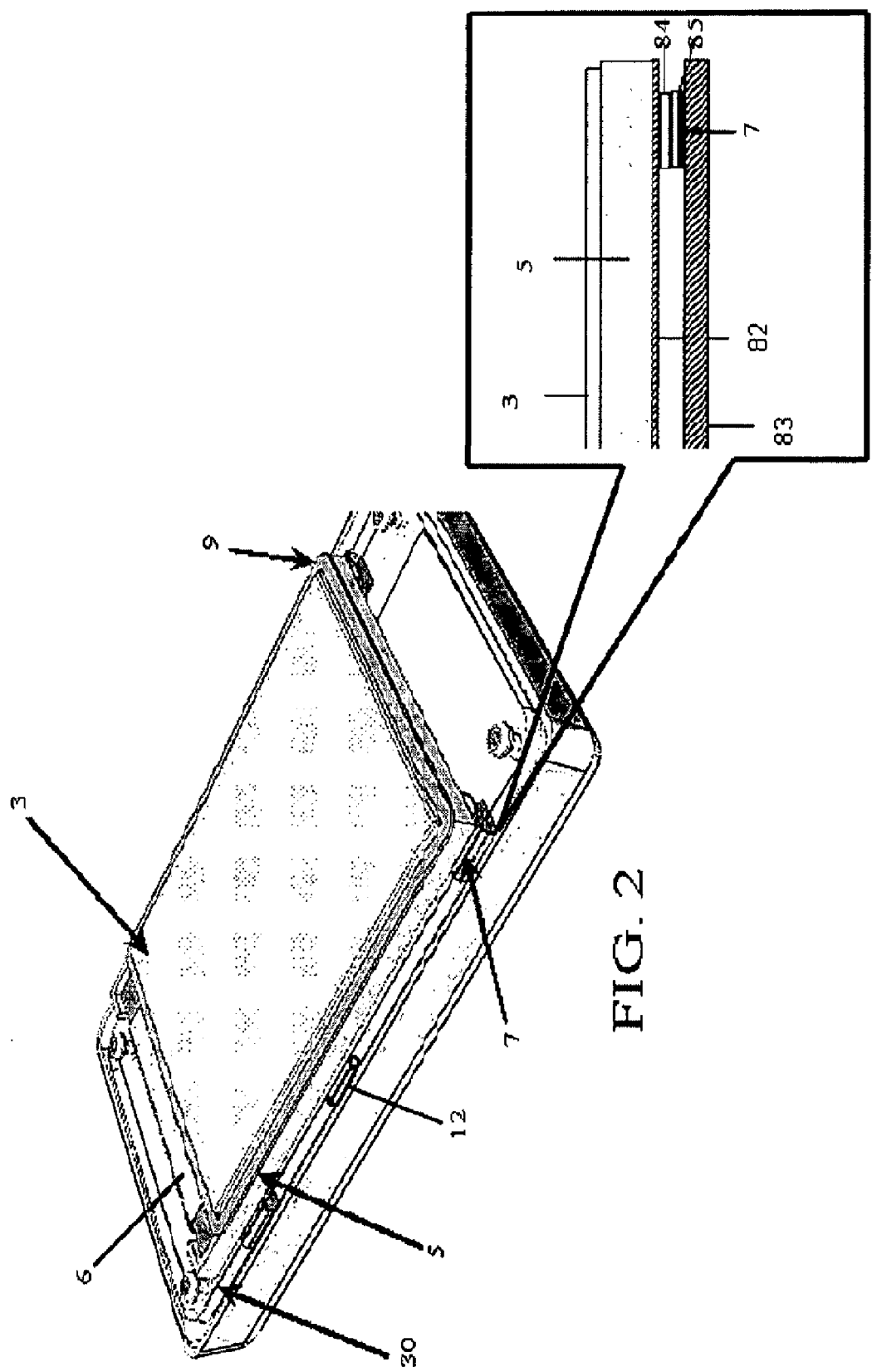
FIG. 2 is a side perspective view of the device 1 with touch screen assembly 2 as in FIG. 1.

FIG. 1 is a high level representation an electronic device 1, such as a PDA or a cellular phone, having a touch screen assembly 2 according to one embodiment of the present invention, and FIG. 2 is a side perspective view One skilled in the art should understand that the touch screen assembly 2 may be incorporated in cellular phones and personal digital assistants (PDAs), PC Tablets, as well as laptops, PCs, office equipment, medical equipment, or any other device that uses touch sensitive displays or panels.

The touch screen assembly 2 employs a touch surface comprising a pressure sensitive lens (PSL) 3 overtop (and preferably bonded to) an underlying LCD or OLED module 5. The PSL 3 covers the LCD/OLED module 5 and may additionally cover static keys on the keypad 4 as seen in FIG. 1. As will be explained, LCD/OLED module 5 has a plurality (such as, for example, four) differentially-mounted sensors 7 beneath it all connected to the electronic device 1 processor. This way, when a user touches the PSL 3, the touch pressure is transmitted through the LCD/OLED module 5 into the sensors 7 where it is registered, processed, the exact "touch-coordinate" is calculated, and the touch coordinate is interpreted and proper control signal(s) are generated It is noteworthy that the touch sensitivity area can be extended beyond the display module 5 display area. For example, in the example of FIG. 1 the PSL 3 also extends over a static printed keypad area 4. Regardless of whether a user presses a key in the static keypad area 4 or some portion of the LCD/OLED module 5 area, exactly the same behavior is triggered. The exact "touch-coordinate" is calculated, the touch coordinate is interpreted, and proper control signal(s) are generated. If, for example, the user presses a Left-Arrow Command key, the corresponding left arrow command is generated. As will be described, the touch screen assembly 2 may optionally be equipped with a haptic response generator 12 along with the sensors 7, such as a piezo element or a magnetic inductive coil. In this case whenever the PSL 3 is depressed a short vibration burst is generated by the haptic element 12 and the user can feel as if the "key" was pressed.

Figure 3:
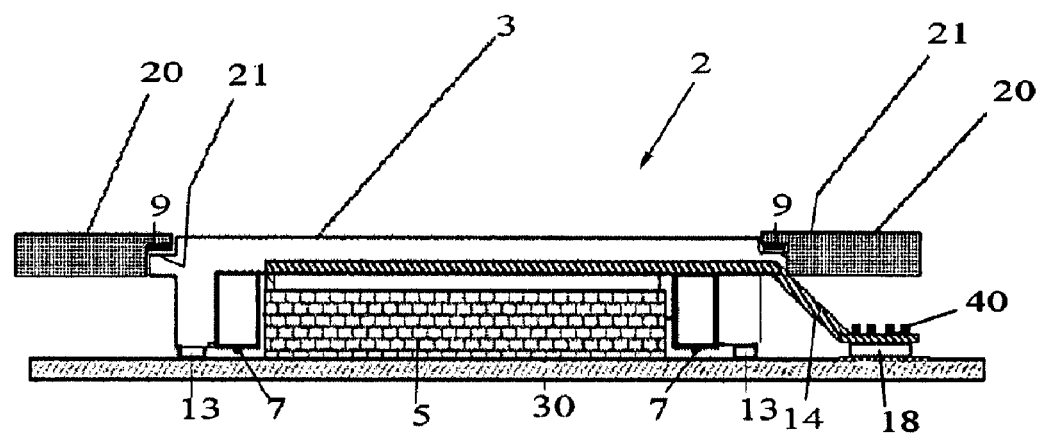
FIG. 3 is a cross-section of the touch screen assembly 2 for touch sensitive displays or touch pad implementations as in FIGS. 1-2 illustrating how the PSL 3 is housed inside the overall mechanical cover 20 of the electronic device 1.

FIG. 3 is a cross-section of the touch screen assembly 2 for touch sensitive displays or touch pad implementations as in FIGS. 1-2 illustrating how the PSL 3 is housed inside the overall mechanical cover 20 of the electronic device. In this embodiment the lens 3 is formed with a tongue and groove lip 21 that protrudes under the device's mechanical housing 20. This prevents the PSL lens 3 from falling out, but allows it to be free to move downward when depressed. The area between the housing 20 and the lens 3 preferably holds a rubber gasket 9 to limit the movement of the lens 3, damp shock and vibration, and seal the device from dirt and dust. The PSL 3 includes downwardly protruding side flanges that sandwich the sensors 7 against the underlying main device circuit board 30. The movement required from 0-pressure applied to maximum pressure applied/maximum allowed movement, as allowed by the rubber gasket 9 is typically between 0.01-0.1 mm.

In order to ensure full functionality of the touch screen assembly 2 even as the device is held upside-down, the sensors 7 may be preloaded. This entails pre-engaging the sensors 7 with the PSL 3 with an equal force greater than the weight of the PSL 3 to ensure that the four sensors 7 are always engaged. This is especially important with FSR sensors. By adding a predetermined pre-loading force over each FSR sensor 7 they will be always be engaged and even the lowest applied force will result in a controlled and repeatable sensor output, allowing the touch coordinates to be readily determined.

In addition, calibrated-length pylons 13 are provided which extend down from beneath the lens 3 to serve as stops to limit the maximum allowed movement and prevent over-compression of the sensors 7. These pylons 13 are optional for FSR sensors 7, but are essential when traditional piezo resistive sensors are used.

The sensors 7 may be connected by a flex film 14 connected via a connector 18 that mates directly with the main circuit bard of the cell phone or other electronic device, and peripheral components 40 can be mounted atop the flex film 14 if desired. The four differentially-mounted pressure sensors 7 may be mounted directly on the device printed circuit board 30 or under the LCD/OLED module 5, both as described below. One skilled in the art should readily understand that more conventional wires, multiple printed circuit boards, or combinations thereof may be used in lieu of a flex film 14 and connector 18.

Each pressure sensor 7 preferably comprises a Force Sensing Resistor (FSR), which typically is a polymer applied over a conductive metal part or trace. FSR sensors 7 use the electrical property of resistance to measure the force applied to the sensors 7. Given a plurality (such as, for example, four) differentially-mounted sensors 7, each sensor registers a different force as a function of the two-dimensional (x, y) coordinates along the plane of the lens 2. By calculating the differential pressure at the corners the exact coordinate of the actual touch can be calculated.

Figures 4, 5:
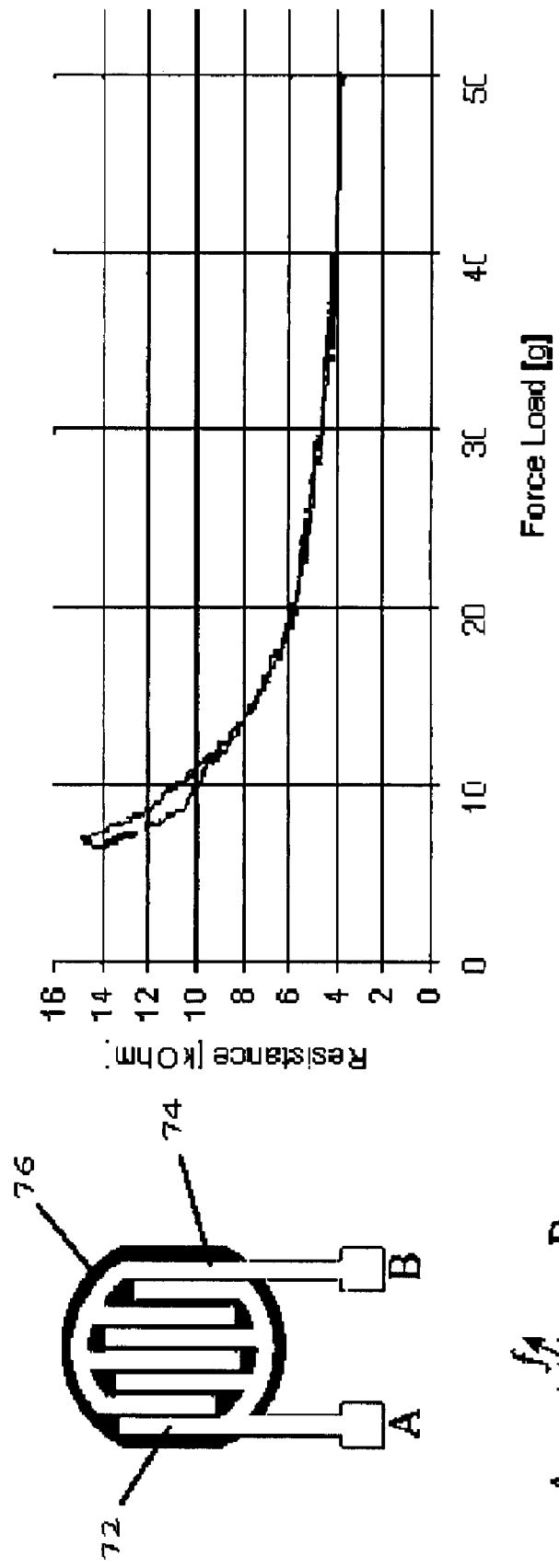
FIG. 4 is a schematic diagram of an individual FSR sensor 7.
FIG. 5 shows the resistance of the sensor 7 (in kOhms) as a function of force (g).

FIG. 4 is a schematic diagram of an individual FSR sensor 7, which includes a pair of conductive traces 72, 74 printed on a pressure-sensitive variable-resistance material 76, which may be a known ink or polymer. The resistive material 76 creates a variable electrical path between the two traces 72, 74. When a force is applied to this sensor 7, the resistance of material 76 is decreased.

FIG. 5 shows the resistance of the sensor 7 (in kOhms) as a function of force (g). It is important to note the three regions of operation of the sensor. The first is an abrupt transition which occurs somewhere in the pressure area of 10 to 100 grams of force. Above this, the force is approximately proportional until saturation, at which point additional forces do not decrease the resistance. A benefit of using integrated FSR sensors is that the voltage output is typically ten times higher then the voltage output for a piezo-resistive force sensor. This higher voltage output eliminates the need for additional analog signal amplification, thereby further reducing both required board space as well as component costs. The mechanical design is further simplified by use of the FSR sensor since these sensors do not need to be protected against overpressure, whereas a typical piezo resistive sensor does. As mentioned above a controlled pre-loading force is applied to each sensor 7 to ensure full functionality of the touch screen assembly 2 even as the device is held upside-down. As illustrated in FIG. 5, the initial force applied may not result in any voltage output, or a very irregular output. By adding a very controlled pre-loading force over each sensor 7, the FSR sensors 7 remain always engaged and even the lowest applied force will result in a controlled and repeatable sensor output, which means that the touch coordinates can be determined.

Referring back to the inset of FIG. 2, the sensors 7 may be attached underneath the LCD/OLED module 5 rather than on the device printed circuit board 30. This is accomplished by adding a conductive material layer 82 underneath the LCD/OLED module 5. A spacer 84, if needed, and the FSR resistive polymer 85 are then applied on top of the conductive material 82. For improved performance, some type of backing material, such as Poron™, may be added to the sensor 7. The conductive traces run along the conductive material 82, and per general FSR sensor design (for each of the four sensors) is connected to the flex film 6 or by a separate flex film connector to the main device circuit board 30. With this configuration the LCD/OLED module 5 can then be supplied with all four FSR sensors 7 pre-integrated as a unit.

Figure 6:
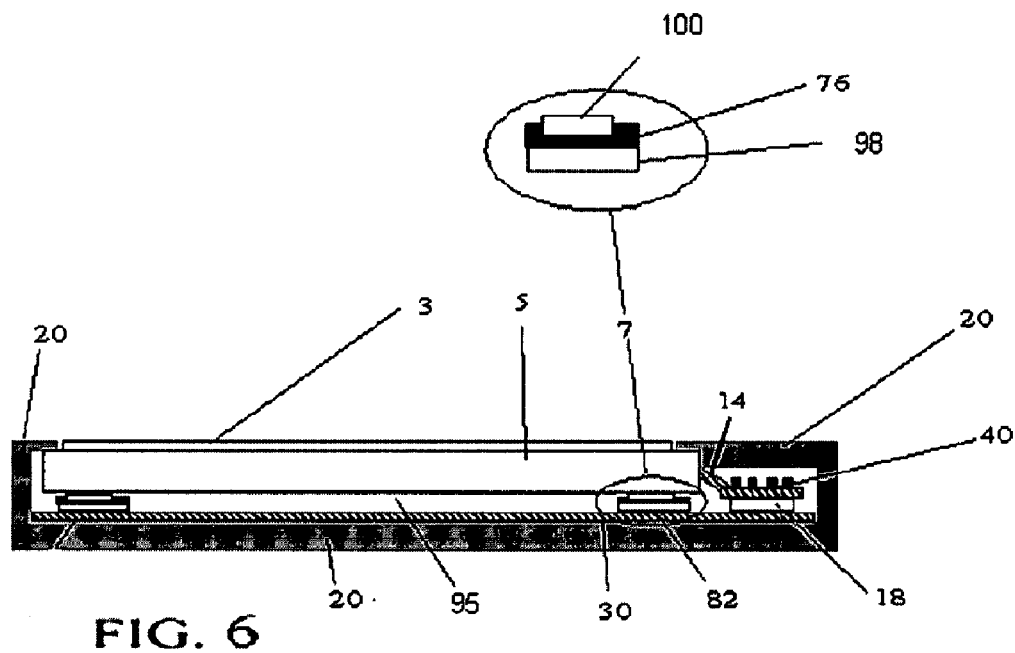
FIG. 6 illustrates how the sensors 7 may be mounted on the main device PCB board 30.

As an alternative to integration of the sensors 7 with the LCD/OLED module 5, FIG. 6 illustrates how the sensors 7 may be mounted on the main device PCB board 30. Here the conductive material layer 82 is bonded to the underlying PCB 30 or etched directly into the PCB 30. The PCB 30 is designed with two finger-like conductive traces (72, 74 as in FIG. 4). Mounted on top of this trace-area is a spacer 98 (see inset) and the pressure-sensitive variable-resistance material 76, which are in turn mounted onto the underside of the LCD/OLED module 5. In addition, in this implementation, the LCD/OLED module 5 is equipped with a slightly protruding cylindrically formed foot 100 as so called "activator" (it is generally known that the surfaces of an FSR sensor may be coated in silicone which, upon axial compression, promotes FSR activation). The "activator" enables the FSR sensor material to be compressed over a longer distance, which ensures a better resolution and a higher dynamic range of the sensor. Flex film 14 is extended to a flex film connector 18 that mates directly with the main circuit bard of the cell phone or other electronic device, and peripheral components 40 can be mounted atop the flex film 14 if desired.

Note that for both the integration approaches shown in FIGS. 2 (inset) and 6, the touch screen assembly 2 adds no additional height to the overall device stack. The reason is that, for a device such as a mobile phone, the LCD/OLED module 5 would be protected by the PSL lens 3. The additional height added by the FSR 7 between the LCD/OLED module 5 and the underlying PCB 30 is approximately 0.30 to 0.80 mm depending on materials used. However, in a typical mobile phone design, this space 95 is generally designed to be 1.25 mm high to ensure that low-profile components can be placed underneath. Thus, the added height of the present assembly is therefore null.

As an alternative to FSR sensors 7, a more traditional pressure sensor, such as a piezo resistive force sensor, may be used. These generally comprise a mechanical component and transducer. A plurality (such as, for example, four) commercially-available micro force sensors serve well for the transducers 7. These are available in 7.0×5.2×2.9-mm ceramic packages capable of detecting an applied force of under 1 N. They rely on a silicon element that flexes in response to pressure changes, creating a proportional output signal via internal bridge circuitry.

Figure 7:
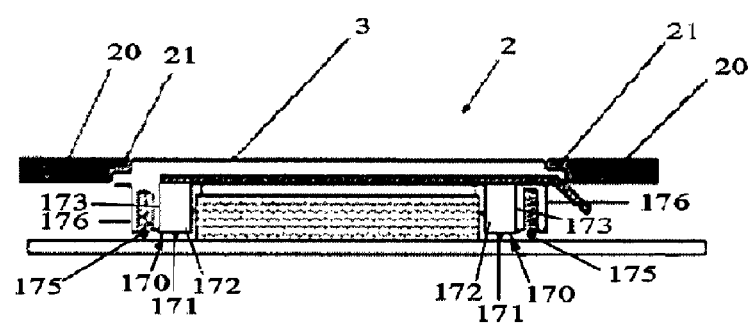
FIG. 7 is an example of the mechanical assembly for use with a traditional piezo resistive-mechanical pressure sensor 170.

FIG. 7 is an example of the mechanical assembly for use with a traditional pressure sensor 170, which includes a mechanical transducer 172 engaged to a small metal ball 171 held captive in the sleeve of a post 173. The ball 171 hits the underlying surface, which could be the main PCB 30 or any mechanical part of the device, and is pressed onto the transducer 172 when pressure is applied to the PSL 3 at the top of the lens assembly 2. In order to ensure that no force is registered when the display is not touched, especially if sensitive pressure sensors are used, the lens assembly 2 may be spring loaded with regular spiral springs 175 integrated in the lens assembly 2, such as in the sleeve of post 173, or by some other spring system or cushioning such as rubber or foam. Preferably, the travel of the lens assembly 2 is limited by parts 16 bottom out to prevent possible damage.

Figure 8:
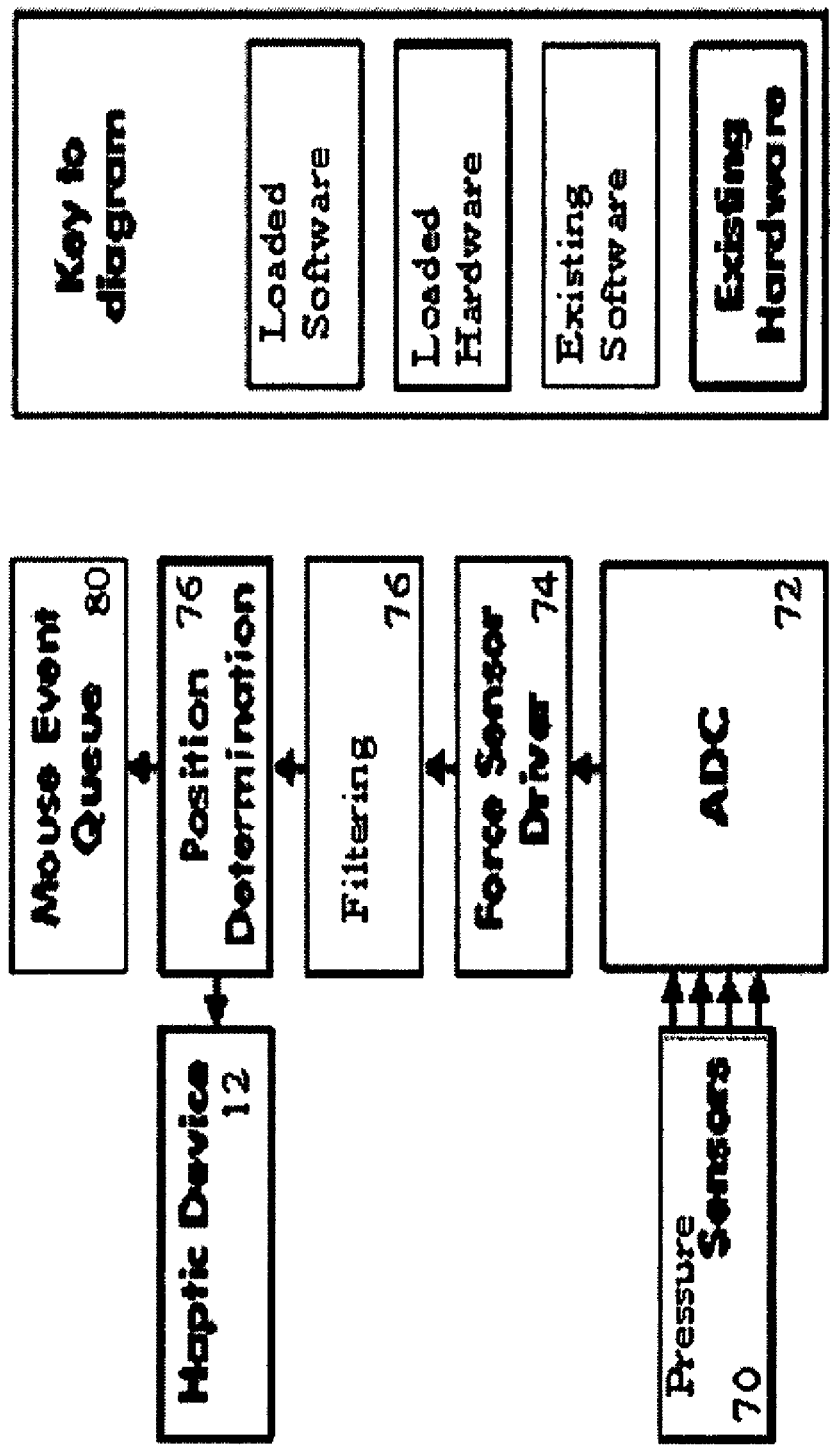
FIG. 8 is a flow diagram illustrating the operation of the assembly.

FIG. 8 is a flow diagram illustrating the operation of the assembly. The peripheral electronic components for the present device may include an amplifier connected to each pressure sensor 7, 170, for example an Analog Devices AD 623, and an A/D Converter connected to the amplifier, such as Analog Devices AD7888. These and all peripheral resistors, power supply, etc. may be mounted on the main device PCB 30 or flex-PCB 6, 14 as desired.

The output from each pressure sensor 7, 170 is amplified if the voltage output is low, and at step 72 is converted to digital (A/D converted) and delivered to a software force sensor driver 74, which may be resident on the device host processor or a dedicated micro processor. The software force sensor 74 driver maximizes the accuracy of the force data by filtering it to remove non-relevant input. For example if a user is walking with the device a jolt may cause the lens 3 to touch the sensors 7. This type of jitter has a rather different "fingerprint" then a key press and is filtered out. The data from all differentially-mounted sensors 7 is combined and adjusted for calibration adjustments (which are pre-recorded by a separate user-calibration application run at start-up), and the x, y coordinates are calculated. The calculation is time-based for higher accuracy. Thus, a time-based sequence of data points are captured for each key press. The low-force values, that is, those in the beginning of the time based sequence, and the high force values at the end may be filtered out and the remaining data points used to calculate an average for the final x and y coordinates. As an alternative, just the data sample with the peak force can be used for the coordinate calculation, or the amount of the force may be used to weight the x & y values in the average calculation. If desired, the actual or average force can also be recorded for later use.

Where the sensors 7 are preloaded as above an adjustment is made for the preload force. For example, given a plurality $n=1 \ldots m$ of pressure sensors mounted below te PSL 3 and differentially positioned along the x- and y-axis, and assuming that each pressure sensor is compressed with a preload force $p_{1-m}$, the compensated pressure $Pc_{1-m}$ from a touch of the PSL 3 at any position along the x- and y-axis will be $Pc_{1-m} = z_{1-m} - p_{1-m}$. This results in a time-based sequence of data sets $(x_{1-m}, y_{1-m}, Pc_{1-m})$.

The output from the software force sensor driver 74 is an x,y coordinate, which is then input to the Mouse Event Queue 80 resident on the host processor and, optionally, is sent to a haptic software driver 82 and on to the haptic device 12 (FIG. 2) for generating haptic user feedback as the display is being pressed.

Figure 9:
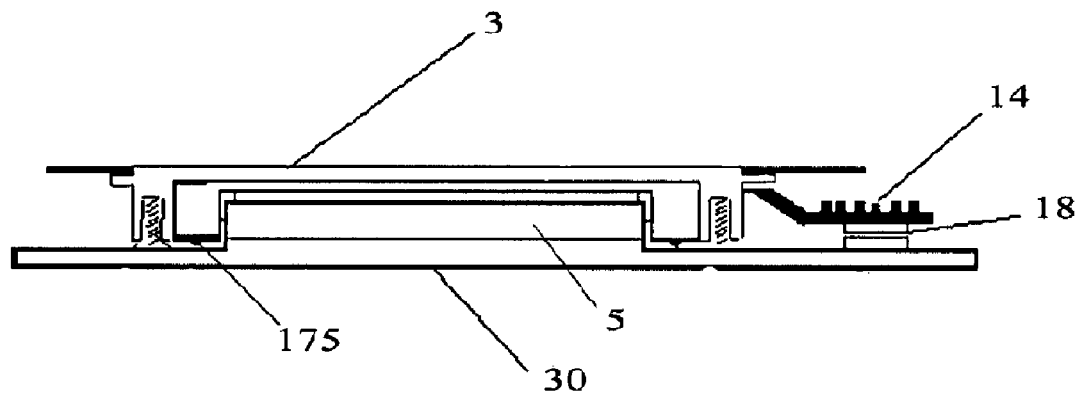
FIG. 9 is a cross-section of pressure sensitive lens assembly 2 for touch sensitive display or touch pad implementation.

FIG. 9 is a cross-section of pressure sensitive lens assembly 2 for touch sensitive display or touch pad implementation. PSL assembly 2 includes an overlying transparent lens 3 formed, for example, of 0.030 Polycarbonate or heat stabilized Polyester. The lens 3 carries all the required electronic and mechanical components around its underside around the periphery, all preferably being backside surface-mounted circuit components mounted on a thin film flex film PCB, with electrical traces connected via a flex film 14 to the four differentially-mounted pressure sensors 175. One skilled in the art should readily understand that more conventional wires, a printed circuit board, or combination thereof may be used in lieu of a flex film 14 and connector. Here flex film 14 is extended to a flex film connector 18 that mates directly with the main circuit board of the cell phone or other electronic device. Note that the pressure sensors 175 are self-contained devices mounted orthogonally and oriented rearwardly from the transparent lens 3. Each pressure sensor 175 comprises a mechanical component and transducer as above. Again, a plurality (such as, for example, four) commercially-available micro force sensors serve well for the transducers. The pressure sensor transducers are engaged to a small metal ball held captive in a post. The ball hits the underlying surface 30, which could be the main PCB or any mechanical part of the device, and is pressed onto the transducer when pressure is applied to the top of the PSL lens 3. Given a plurality (such as, for example, four) differentially-mounted sensors 175, each sensor registers a different force as a function of the two-dimensional (x, y) coordinates along the plane of the lens 3. By calculating the differential pressure at the corners the exact coordinate of the actual touch can be calculated. In order to ensure that no force is registered when the display is not touched, especially if sensitive pressure sensors are used, the lens assembly 2 may be spring loaded as described above.

Figure 10:
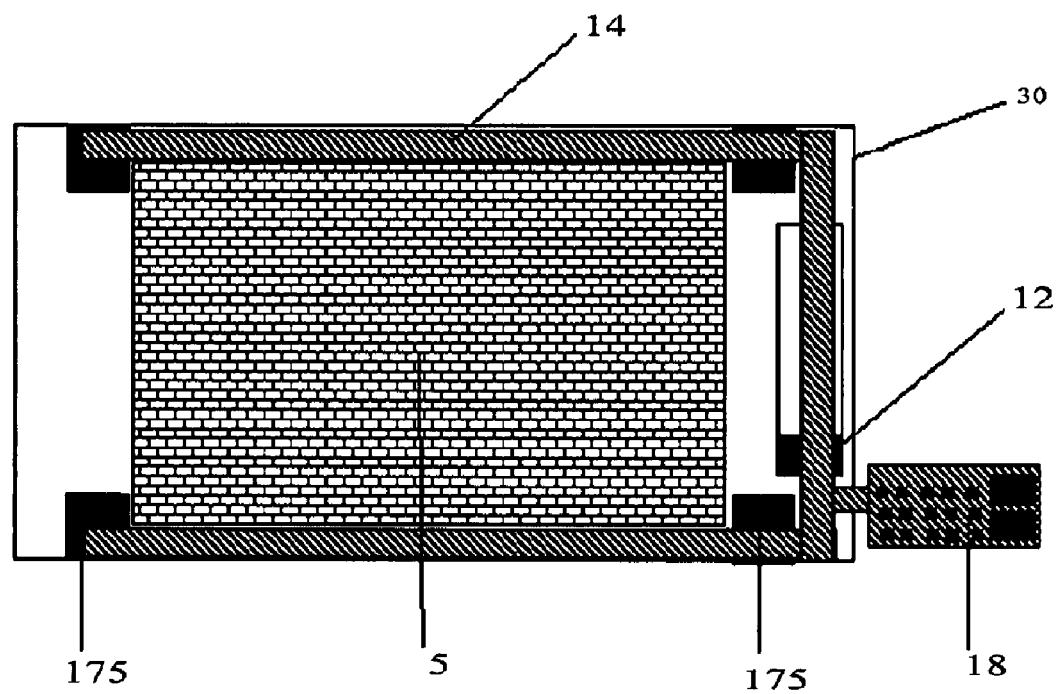
FIG. 10 is a top view of the touch assembly 2 of FIG. 9 viewed from above, without mechanical housing 20.

In FIG. 10, the touch assembly 2 is viewed from above, but without mechanical housing 20. The underlying display 5 can be viewed through the assembly's lens 3. Electrical connectors 14 are formed on the flexfilm lens 3 and run in areas normally covered by the outside mechanics, here alongside the display 5. In this embodiment, the plurality of pressure sensors 175 are connected through the flexfilm trace connectors 14 and through the peripheral electrical components, such as amplifiers, etc, and on to the host processor PCB underneath. The fact that the lens 3 pursuant to the foregoing embodiment is not fixed to the mechanical housing 20, it can be made to vibrate independent of the mechanical housing 20. This makes the present construct especially well-suited for addition of a piezo element 12 to provide haptic feedback. The piezo element 12 is also connected through the flexfilm 14 and is here included in the assembly. The integrated piezo element 12 can provide user feedback, either haptic and/or audio feedback. As the user touches the lens and the controller unit registers the touch and the coordinates are sent for further processing. At the same time the piezo element 12 is commanded to vibrate for a short period of time such as 5 to 50 milliseconds. Since the lens assembly 2 is only loosely connected to the device housing 20, it can be made to vibrate rather easily and the user will not just see the effect of the touch command, but actually get instant feedback in the form of vibration on the finger that a key has been pressed and the key press was registered. One skilled in the art will understand that other component types (other than piezo) may be used, such as an inductive magnetic coil, for example an SMD Inductance coil from Darfon Electronics Corp., coupled to vibrate a magnetic element. In addition to the haptic element, additional electric components, such as digital to analog converter and amplifier will also be mounted on the flex film 14. An advantage of using a piezo element over a coil is that the piezo element doubles as both haptic generator and speaker. Both types of haptic elements, coil and piezo, can take the place of the separate vibrator used for vibrating alert for incoming calls in a mobile phone.

Figure 11:
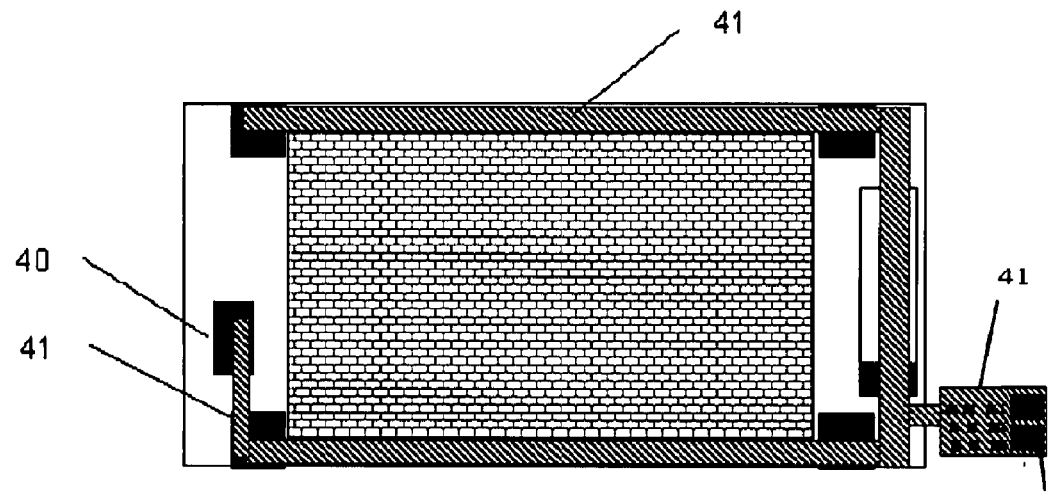
FIG. 11 illustrates the above-described touch assembly 2 with the addition of a two- or three-dimensional motion sensor 40.

FIG. 11 illustrates the above-described PSL 2 with the addition of a two- or three-dimensional motion sensor 40. Motion sensor 40 is likewise connected through flex film 14 of the lens assembly and on to the host PCB 42. Motion sensor 40 is preferably a commercially available MEMs motion sensor such as Analog Device's™ three-axis iMEMS (integrated MEMS) Motion Signal Processing Sensor, which enables very small, low power three-axis (x-y-z) sensing from a single, low-power chip. This allows the mobile device to respond intelligently to position, orientation and movement.

More specifically, user movement of the device can be registered and used as input in controlling the device. For example, the user can pan scroll over a larger virtual display area or zoom in or out trough movements rather then key presses. The principles for this type of user interface control through movements are described in the PCT publication WO 0127735, which is herein incorporated by reference.

Figure 12:
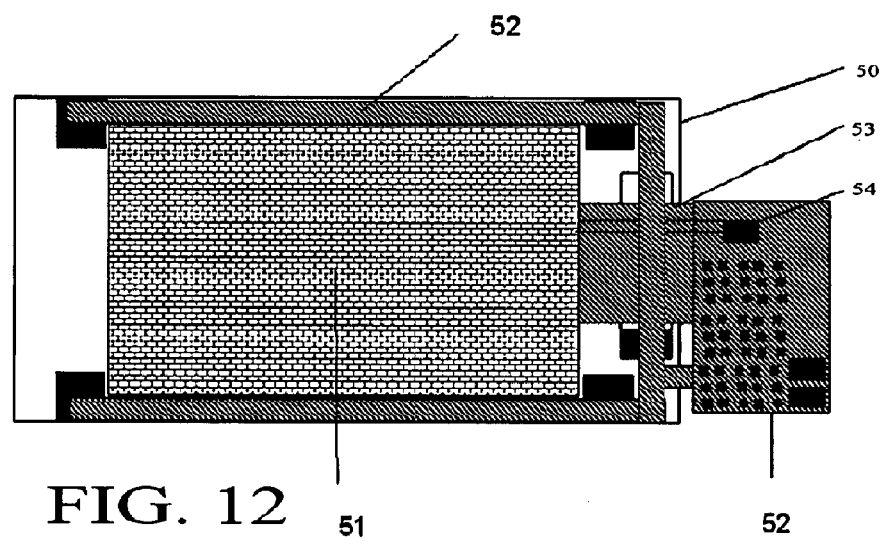
FIG. 12 shows still another embodiment in which the display 51 is likewise connected through a shared flex film 53.

FIG. 12 shows still another embodiment in which the display 51 is likewise connected through the shared flex film 53, both the display 51 and PSL 2 being connected to the PCB 50 together through one or multiple flex film connectors 52. Thus, the flexfilm 53 from the display 51 is connected with the flex film for the complete assembly. The present embodiment also includes backlighting for the display 51 and a dedicated power supply 54 is mounted on the flex film 53 to power the display backlight. The backlighting may be a separate component mounted behind the display, or may be integral to the display or PSL assembly 2, in which case the backlight is slid underneath the lens.

One skilled in the art will understand that the integrated pressure sensitive lens assembly in the foregoing embodiments can be further optimized in terms of making it simpler to integrate and thereby lowering the implementation cost and time for the final product, and also shortening the time to market for products using the assembly. This is possible by implementing the above-described software loaded onto the host processor on a standalone processor with integrated memory (or separate component memory), directly onto to the lens assembly flex film 14 (referring to FIG. 7). In this case all the positioning calculations described above are performed by the standalone processor rather than the device host processor. The advantage here is that the need for software integration is greatly reduce and the communication between the sub-assembly and the rest of the device can be made via a simple communication applet running on the host processor. The content to be communicated in this case comprises the "x" and the "y" coordinates, an interrupt or "wake-up" call from the display, and the "z" value which is the size of the force.

As seen in FIG. 2, the lens forms the basis for a mechanical build-up, where flex film and components can be added. In an implementation where the mechanical limitations are not as strict as for a cellular phone, for example for a laptop or tablet PC, the assembly is completely modularized to ensure simple design and assembly.

It should now be apparent that the above-described invention in each of its embodiments provides a low-cost pressure sensitive touch sensitive display solution suitable for manufacturers of portable electronic devices such as cell phones and PDAs. The device is a turnkey solution that is ready to be integrated into an overall product design without disrupting the existing cost or form factor of the electronic device.

Having now fully set forth the preferred embodiments and certain modifications of the concept underlying the present invention, various other embodiments as well as certain variations and modifications thereto may obviously occur to those skilled in the art upon becoming familiar with the underlying concept. It is to be understood, therefore, that the invention may be practiced otherwise than as specifically set forth herein.

INDUSTRIAL APPLICABILITY

Touch screens are being deployed in an increasing number of products using an array of several types of technology. As the products continually decrease in size, the demand for inexpensive, low-profile and precise touch screens is increasing. Indeed, when used in a smaller electronics device the sensor must also be thin, i.e., less than about 20 mils maximum thickness, and should also be capable of modular assembly for more-or-less "snap-in" construction. In today's electronic industry the manufacturer of an electronic device utilizing a pressure sensitive touch sensitive display solution will look to their display supplier for a complete solution that is ready to be integrated into the overall product design. Despite the availability of the existing sensing technologies mentioned herein, the prior art has been unable to provide a low-cost sensor assembly having sufficient sensitivity, surface robustness, accuracy and form factor. Therefore, there is significant industrial applicability in the present invention which provides a force sensing technology which overcomes some of the deficiencies of the prior art.

I claim:

1. A touch screen assembly for an electronic device having an LCD or OLED display module, comprising:
   a lens over said display module;
   a plurality n=1 . . . m of differentially-mounted pressure sensors mounted beneath said display module and differentially positioned along an x- and y-axis, said pressure sensors being electrically connected to the electronic device for registering a pressure z from a touch of said lens at any position along said x- and y-axis and for providing an analog differential pressure signal z over a duration of said touch of said lens;
   a circuit for converting said analog differential pressure signal into a time-based sequence of digital data sets $(x_{1-m}, y_{1-m}, z_{1-m})$ each data set comprising a sequence of data points x, y, z for each of said plurality n=1 . . . m of differentially-mounted pressure sensors measured at successive time instants during the duration of said touch of said lens; and
   control software for filtering said time-based sequence of data sets $(x_{1-m}, y_{1-m}, z_{1-m})$ by removing non-relevant data points x, y, z from said time-based sequence, and for interpreting the filtered data set as an exact touch-coordinate x, y and pressure z resulting from a touch of said lens along said x- and y-axis, and for generating a control signal in accordance with said filtered and interpreted touch coordinate.

2. The touch screen assembly for an electronic device according to claim 1, wherein said differentially-mounted pressure sensors further comprises Force Sensing Resistor (FSR) sensors.

3. The touch screen assembly for an electronic device according to claim 2, wherein said differentially-mounted FSR sensors include four FSR sensors.

4. The touch screen assembly for an electronic device according to claim 1, further comprising a haptic response generator coupled to said lens for generating a vibration burst when a pressure is registered against said lens.

5. The touch screen assembly for an electronic device according to claim 1, wherein said lens is a floating lens over said display module.

6. The touch screen assembly for an electronic device according to claim 5, wherein said floating lens extends over a keypad of said device.

7. The touch screen assembly for an electronic device according to claim 1, wherein said pressure sensors each comprise a piezo resistive force sensor mounted orthogonally from the lens.

8. The touch screen assembly for an electronic device according to claim 1, wherein said control software filters successive data sets to remove non-relevant input.

9. The touch screen assembly for an electronic device according to claim 1, further comprising a motion sensor connected through said connection layer for responding to position, orientation and movement.

10. The touch screen assembly for an electronic device according to claim 1, wherein said control software is resident in a host processor of said electronic device.

11. The touch screen assembly for an electronic device according to claim 5, wherein said electronic device comprises a housing with an aperture and said floating lens comprises a tongue and groove periphery for engaging said electronic device housing and allowing a downward degree of freedom.

12. A touch screen assembly for an electronic device having a display, comprising:
   a floating lens suspended over said display to allow a degree of freedom.
   an underlying flex film connection layer attached beneath at least a portion of said floating lens;
   four differentially-mounted pressure sensors mounted beneath said floating lens and differentially positioned along an x- and y-axis, said pressure sensors being electrically connected to the electronic device via said connection layer for registering a pressure z from a touch of said lens at each of said four positions over a duration of said touch of said lens;
   a circuit for converting said pressure z from a touch of said lens at each of said four positions into a time-based sequence of digital data sets $(x_{1-4}, y_{1-4}, z_{1-4})$, each data set comprising a sequence of data points x, y, z for each of said four differentially-mounted pressure sensors measured at successive time instants during the duration of said touch of said lens; and
   control software for filtering said time-based sequence of data sets by removing non-relevant data points x, y, z from said time-based sequence and interpreting said filtered data sets $(x_{1-4}, y_{1-4}, z_{1-4})$ as a single data set x, y, z) representative of a touch coordinate and for generating a control signal in accordance with said touch coordinate.

13. The touch screen assembly for an electronic device according to claim 12, further comprising a haptic response generator coupled to said lens for generating a vibration burst when a pressure is registered against said lens.

14. The touch screen assembly for an electronic device according to claim 12, wherein said floating lens extends over both of said display and keypad.

15. The touch screen assembly for an electronic device according to claim 12, wherein said pressure sensors each comprise an Force Sensing Resistor (FSR) sensor.

16. The touch screen assembly for an electronic device according to claim 12, wherein said pressure sensors each comprise a mechanical component and transducer mounted orthogonally from the transparent lens.

17. The touch screen assembly for an electronic device according to claim 12, wherein said floating lens assembly is spring loaded.

18. The touch screen assembly for an electronic device according to claim 12, wherein said software component records a number of data points over time during each key press.

19. A touch screen assembly for an electronic device having an LCD or OLED display module, comprising:
   a lens over said display module;
   a plurality n=1 . . . m of pressure sensors mounted below said lens and differentially positioned along an x- and y-axis, each of said pressure sensors being compressed with a preload force $p_{1...m}$ and electrically connected to the electronic device for registering a pressure $Pc_{i-m}$ from a touch of said lens at any position along said x- and y-axis and for providing an analog differential pressure signal over a duration of said touch of said lens;

a circuit for converting said analog differential pressure signal into a time-based sequence of data sets ($x_{1-m}$, $y_{1-m}$, $z_{1-m}$), each data set comprising a sequence of data points x, y, z for each of said plurality n=1...m of differentially-mounted pressure sensors measured at successive time instants during the duration of said touch of said lens; and control software for compensating said time-based sequence of data sets ($x_{i-m}$, $y_{i-m}$, $z_{i-m}$) by adjusting data points $z_{1-m}$ within said time-based sequence in accordance with a formula $_{Pc1...m}=z_{1-m}-Pc_{1-m}$, and for interpreting said modified time-based data sets ($x_{i-m}$, $y_{i-m}$, $p_{ci-m}$, as a sin le non-time-based data set x, y, z) resentative of a touch coordinate to provide an exact touch-coordinate and for generating a control signal in accordance with said touch coordinate.

20. The touch screen assembly for an electronic device according to claim 19, wherein said differentially-mounted pressure sensors further comprise four Force Sensing Resistor (FSR) sensors.

21. The touch screen assembly for an electronic device according to claim 19, further comprising a haptic response generator coupled to said lens for generating a vibration burst when a pressure is registered against said lens.

22. The touch screen assembly for an electronic device according to claim 21, wherein said pressure sensors each comprise a piezo resistive force sensor mounted orthogonally from the lens.

* * * * *